United States Patent Office 2,984,139
Patented May 16, 1961

2,984,139

STAPLE FIBER CUTTER WITH CUTTER BLADE ROTATED TO PRESENT SUCCESSIVELY NEW CUTTING PORTIONS IN EACH CUTTING CYCLE

Frederick R. Smith, Nitro, and Herman F. Stuhr, Jr., St. Albans, W. Va., assignors to American Viscose Corporation, Philadelphia, Pa., a corporation of Delaware Filed Sept. 24, 1958, Ser. No. 763,110

1 Claim. (Cl. 83—403)

This invention relates to apparatus for cutting continuous filaments into staple fibers and especially to apparatus for cutting tows or bundles of artificial filaments of rayon, nylon, cellulose acetate and the like. More particularly, this invention relates to a staple fiber cutter of the type known as a Beria cutter such as shown in the patent to Beria No. 1,723,998.

In general, the cutter over which the present invention constitutes an improvement comprises a rapidly rotating disk having a radial passageway therein which communicates at the center of the disk with an upwardly directed axial opening. Continuous lengths of artificial filaments, usually in the form of a tow or bundle, are fed into the axial opening and ejected outwardly through the radial passageway of the disk by centrifugal force. The bundle of filaments may be fed to the cutting apparatus directly from the end of a spinning machine and the constant rotation of the disk assures that the filaments move through the disk at a uniform speed. Located adjacent the periphery of the disk is a sharp edged cutter which intercepts the filaments each time the disk makes one revolution so as to cut the filaments into uniform lengths. The particular lengths into which the filaments are cut may be varied by varying the speed of the disk. In the Beria patent referred to above, the sharp edged cutting member is stationarily mounted so that the same portion of its cutting edge is constantly contacted by the filaments and such an arrangement of course results in fairly rapid wear of the cutting edge with the result that as the edge becomes dull certain of the filaments in the bundle are not cut cleanly.

It is the primary object of this invention to provide a staple fiber cutter of the Beria type with means for substantially increasing the useful life of the cutting element.

It is a more particular object of the present invention to provide a staple fiber cutter of the general type referred to above wherein the cutting member is circular and has a cutting edge extending around its entire periphery and wherein said cutting member is caused to rotate slowly as the main filament feeding disk rotates so as to continuously present different portions of the cutting edge to the fibers.

Other and further objects, features and advantages of the invention will become apparent as the description of a preferred embodiment thereof proceeds.

Referring now to the drawing.

Figure 1:
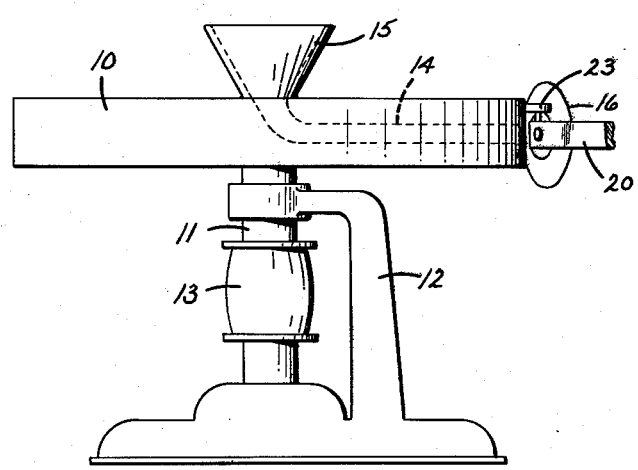
Figure 1 is a side elevational view of a staple fiber cutter of the present invention.
Figure 2:
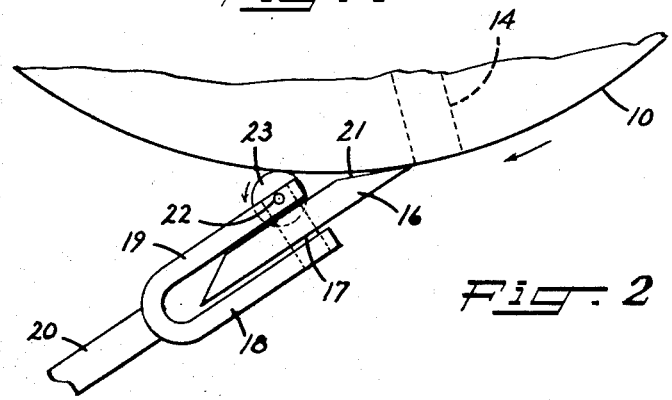
Figure 2 is a plan view of a portion of the apparatus.

The apparatus comprises a filament feeding and shear member in the form of a disk 10 secured to a shaft 11 rotatably mounted in a support 12 and carrying a sheave 13 by means of which the shaft and disk may be rotated at high speed by means of a suitable belt drive, not shown. The disk 10 is provided with a radial bore or passageway 14 which communicates axially of the disk with an upwardly directed funnel 15. Continuous filaments in the form of a tow or bundle are led from a spinning machine or other source into the funnel 15 and are thrown outwardly by centrifugal force through the radial passageway 14.

A circular cutting member 16 is mounted adjacent the periphery of the disk 10 in such manner that a portion of the circular cutting edge thereof lies just slightly out of contact with the periphery of the disk. The cutting member may be positioned to actually contact the periphery of the disk, but to reduce the wear on the cutting edge it is preferable to provide a very slight clearance. Each rotation of the disk 10 brings the outlet end of the passageway 14 into alignment with the cutting member 16 so that the continuous filaments emerging from said passageway are cut into staple fibers of uniform length by the cutting member. It will be understood that by varying the speed of rotation of the disk 10 the lengths of the fibers cut from the continuous filaments may be varied. Fibers of mixed lengths may also be produced by providing one or more additional cutting members spaced at unequalled distances about the disk 10.

Figure 3:
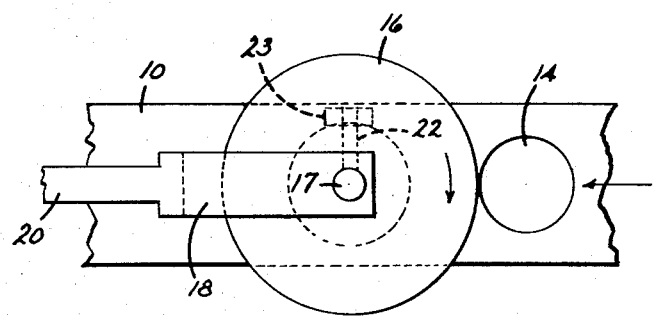
Figure 3 is a side elevational view of the parts shown in Figure 2.

The cutting member 16 is rotatably mounted on a spindle 17 mounted between the arms 18 and 19 of a forked stationary support 20. The edge of the cutter 16 is feathered or beveled as at 21 so that the cutting edge may be positioned substantially tangentially of the periphery of the disk 10. Rotatably mounted on a stub shaft 22 fixed to the arm 19 and extending perpendicular to the spindle 17 is a drive wheel 23. Preferably, the axis of stub shaft 21 intercepts the axis of spindle 16. The drive wheel 23 engages the periphery of the disk 10 and also engages one side of the rotary cutter 16. The wheel 23 may be formed entirely of a resilient, friction providing material or may be provided with a tire of such material so that the rotation of the disk 10 imparts rotary movement to the cutter 16 through said drive wheel. As best shown in Figure 3, the axis of the cutter 16 is aligned with the central area of the periphery of the disk 10 so that the filaments emerging from the passageway 14 strike the cutting edge substantially radially of said cutter. This considerably facilitates the maintaining of proper alignment of the cutter.

The means for rotating the cutter 16 from the disk 10, namely, the drive wheel 23 in that embodiment of the invention shown in the drawing, is so constructed and arranged that with each rotation of the disk a different portion of the cutting edge of the cutter is aligned with the passageway 14. Since the cutting member 16 is circular it provides an elongated cutting edge, different portions of which are continuously being contacted by the filaments as they emerge from the passageway 14 to thus assure a long life for the cutter and eliminate the necessity for frequent adjustment or change of cutting members required in apparatus of this type as heretofore constructed.

Having thus described a preferred embodiment of the invention and its mode of operation, what is claimed is:

An apparatus for cutting filamentary material into staple fibers comprising a rotatable disk, a radial passageway through said disk through which filamentary material is adapted to be ejected as said disk rotates, a circular cutting member mounted for rotation about an axis and having a cutting edge which lies adjacent the periphery of said disk so as to engage and cut the filamentary material emerging from said passageway as said disk rotates, said cutting member being so positioned that the filamentary material engages the cutting edge thereof substantially radially of said member, a resilient drive wheel mounted on an axis which is perpendicular to and intersects the axis of said cutting member, said drive wheel engaging both said disk and said cutting member so as to cause the latter to be driven by the former, and the driving ratio between said disk and said cutting member being such that said cutting member presents a different portion of the cutting edge thereof to the filamentary material each time said disk rotates.

References Cited in the file of this patent

UNITED STATES PATENTS

| | | |
|---|---|---|
| 2,447,617 | Nelson | Aug. 24, 1948 |
| 2,634,810 | Cox | Apr. 14, 1953 |